United States Patent
Chung et al.

(10) Patent No.: US 7,676,114 B2
(45) Date of Patent: Mar. 9, 2010

(54) IMAGING SYSTEM FOR THREE-DIMENSIONAL RECONSTRUCTION OF SURFACE PROFILES

(75) Inventors: Chi Kit Ronald Chung, Shatin (HK); Jun Cheng, Shatin (HK); Y. Edmund Lam, Pokfulam Road (HK); Shun Ming Kenneth Fung, Kwai Chung (HK); Fan Wang, Kwai Chung (HK); Wing Hong Leung, Kwai Chung (HK)

(73) Assignee: ASM Assembly Automation Ltd., Hong Kong (HK)

( * ) Notice: Subject to any disclaimer, the term of this patent is extended or adjusted under 35 U.S.C. 154(b) by 1117 days.

(21) Appl. No.: 11/305,568

(22) Filed: Dec. 16, 2005

(65) Prior Publication Data

US 2006/0132802 A1 Jun. 22, 2006

Related U.S. Application Data

(60) Provisional application No. 60/637,133, filed on Dec. 17, 2004.

(51) Int. Cl.
*G01B 11/24* (2006.01)
*G06K 9/00* (2006.01)
(52) U.S. Cl. .............. 382/286; 382/154; 356/603; 356/608

(58) Field of Classification Search ............ 356/603, 356/608; 382/154, 286
See application file for complete search history.

(56) References Cited

U.S. PATENT DOCUMENTS

| 6,075,605 A * | 6/2000 | Futamura et al. ............ 356/608 |
| 6,104,493 A * | 8/2000 | Fuse et al. .................. 356/627 |
| 2003/0043277 A1* | 3/2003 | Kamon .................. 348/207.99 |

* cited by examiner

*Primary Examiner*—Bhavesh M Mehta
*Assistant Examiner*—Michael Vanchy, Jr.
(74) *Attorney, Agent, or Firm*—Ostrolenk Faber LLP

(57) ABSTRACT

A system for three-dimensional reconstruction of a surface profile of a surface of an object is provided that utilizes a binary pattern projected onto the surface of the object. A binary string consisting of a series of "1"s and "0"s is first created, and a binary pattern of light that is constructed in accordance with the binary string such that bright and dark bands of light of equal widths correspond to "1"s and "0"s from the binary string respectively is projected onto the surface. The binary pattern is shifted with respect to the surface multiple times, during which an image of the binary pattern illuminating the surface is obtained at each position of the binary pattern. Thereafter, a height of each predetermined point on the surface is calculated relative to a reference plane based upon the images cumulatively obtained at said predetermined point.

9 Claims, 3 Drawing Sheets

Unit: Micron

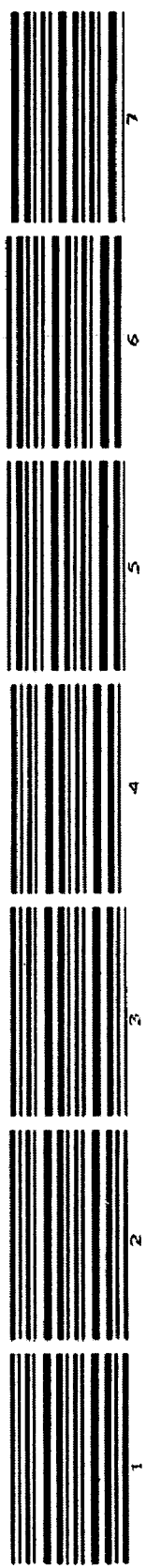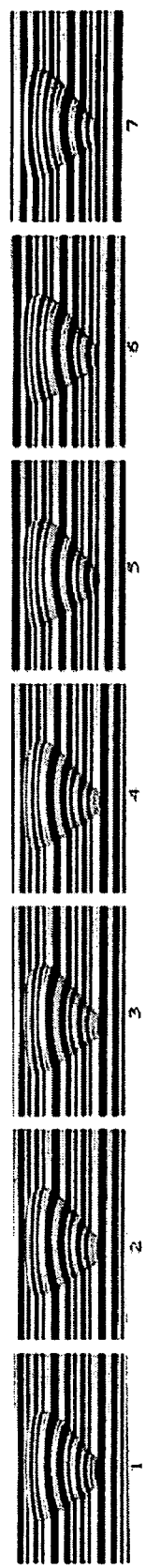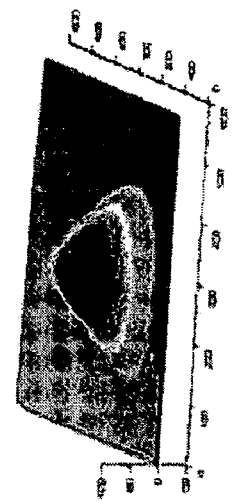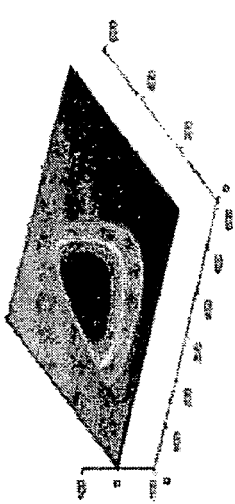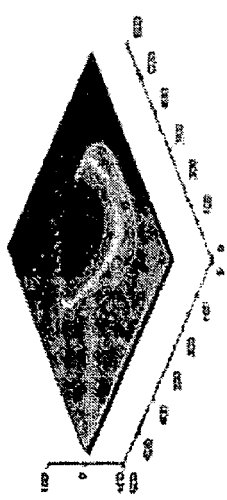
FIG. 5(a)    FIG. 5(b)    FIG. 5(c)

IMAGING SYSTEM FOR THREE-DIMENSIONAL RECONSTRUCTION OF SURFACE PROFILES

CROSS REFERENCE TO RELATED APPLICATION

This application claims the benefit and priority of U.S. Provisional Application Ser. No. 60/637,133 filed on Dec. 17, 2004, and entitled IMAGING SYSTEM FOR THREE-DIMENSIONAL RECONSTRUCTION OF SURFACE PROFILES, the disclosure of which is incorporated herein by reference.

FIELD OF THE INVENTION

The invention relates to the three-dimensional reconstruction of a surface profile of an object by projecting a variable light pattern onto the surface to thereby determine the heights of multiple points on the surface.

BACKGROUND

As the electronic industry advances rapidly towards manufacturing smaller, lighter, faster, and cheaper products, area array packages including Ball-Grid Array ("BGA") packages, Chip-Scale Packages ("CSP"), flip chips, wafer bumping and wafer-level packaging ("WLP") are increasingly becoming the focus of IC packaging technology. Area array packages help to improve device performance and manufacturability, and ultimately reduce manufacturing costs.

However, the reduced dimensions of the devices also lead to more stringent requirements on process control and quality assurance. A particular challenge relates to the development of vision techniques for three-dimensionally inspecting the surfaces of these smaller devices accurately and efficiently. An example would be the inspection of wafer bumps formed on BGA devices.

Specifically, wafer bump heights should be measured and examined in three dimensions to determine if they are defective. However, the small size of the wafer bumps, which typically have diameters of about 60 microns, mean that traditional inspection technologies, such as techniques for inspecting solder bumps on printed circuit boards, are inapplicable. In addition, the highly specular and textureless nature of these devices lead to many difficulties in inspecting their surfaces.

There have been inspection mechanisms proposed for wafer bumps, such as laser triangulation, confocal microscopy and gray-level pattern projection. However, the laser triangulation method is limited by slow speed and low resolution. Confocal microscopy involves moving parts and has limitations in its operation speed. Gray-level pattern projection has the problems of image brightness saturation and high sensitivity to noise.

Further, in inspection methods using continuous gratings (for example, sinusoidal grating methods), several gray-level intensities are used to determine phase displacement to thereby determine surface profile. For this reason it has intrinsic problems like brightness saturation, multi-reflection, and noise or disturbance to gray-level brightness.

It would be desirable to develop a new three-dimensional reconstruction mechanism that is based upon an imaging system that is fast and efficient, and has less noise over current sinusoidal grating systems.

SUMMARY OF THE INVENTION

It is therefore an object of the invention to seek to provide a system utilizing a method for the three-dimensional reconstruction of surface profiles that avoids at least some of the aforesaid disadvantages of the prior art.

Accordingly, the invention provides a method of reconstructing a surface profile of a surface of an object, comprising the steps of: creating a binary string consisting of a series of "1"s and "0"s; projecting a binary pattern of light onto the surface of the object, said binary pattern being constructed in accordance with the binary string such that bright and dark bands of light of equal widths correspond to "1"s and "0"s from the binary string respectively; shifting the binary pattern with respect to the surface multiple times; at each position of the binary pattern, obtaining an image of the binary pattern illuminating the surface; and thereafter with respect to each predetermined point on the surface, calculating its height relative to a reference plane based upon the images cumulatively obtained at said predetermined point.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

FIGS. 5(a)-5(c) illustrate an exemplary three-dimensional reconstruction process for an inspected surface utilizing the irregular binary pattern of FIG. 4 projected onto the surface.

DETAILED DESCRIPTION OF THE PREFERRED EMBODIMENT

Basic Imaging System

The preferred embodiment of the invention utilizes principles of pattern projection. The pattern projection method involves projecting a light pattern onto a surface to be inspected and capturing images of the illuminated surface from one or more points of view. If the pattern is generated in discrete form, i.e. with n-level digitization, and most preferably in binary form, problems of image brightness saturation and sensitivity to noise can be relieved, since only bright or dark areas need to be determined instead of having to take into account gray-level intensity. By changing the position of the fixed binary pattern on the illuminated surface every time an image is taken, a binary code can be produced for each position on the illuminated surface from the sequence of images taken. If the change in the binary pattern is suitably selected, a unique binary code can be produced for each surface position along an axis. With such unique binary codes produced for each surface position, correspondence between the image position and position in the projected pattern can be quickly established. A three-dimensional profile can then be generated from these coded points via triangulation.

Figure 1:
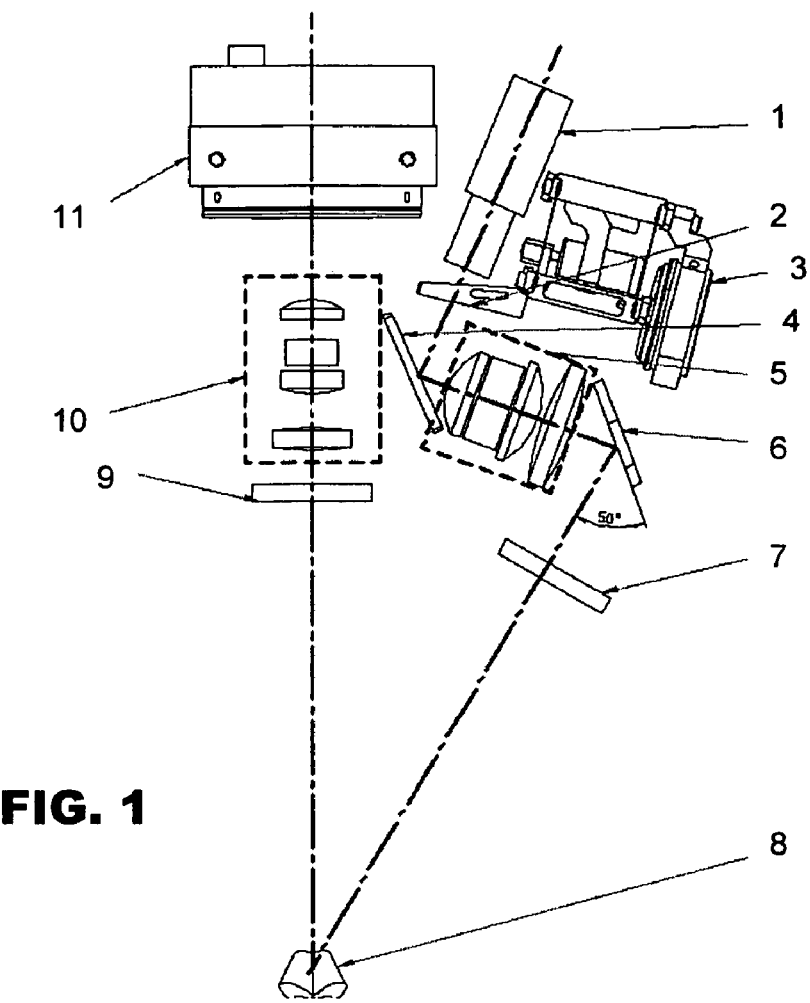
FIG. 1 is a schematic diagram of an imaging system that is suitable for implementing the inspection method according to the preferred embodiment of the invention.

FIG. 1 is a schematic diagram of an imaging system that is suitable for implementing the method according to the preferred embodiment of the invention.

A light source 1 projects light onto a patterned grating 2. The light source 1 may comprise a parallel or a point light source. The patterned grating 2 includes a binary pattern which blocks light at certain positions and allows light to pass through at other positions. The grating is movable by a motion module 3, such as a linear motor, which is preferably operable to physically move the grating 2 by a predetermined distance with respect to the stationary light source 1. Preferably, all points on the surface are illuminated at least once.

As only a single light source is used, the whole system is compact, occupying only a small physical size. In an alternative design, the light source 1 and patterned grating 2 can be replaced by a variable active pattern, which may be produced by a cathode-ray tube or projector that is operative to generate a series of predetermined images with a fixed binary pattern that is shifted in space. However, this is less preferred as the design will typically be less compact.

An optical system 5 is preferably also included to image the said pattern onto an object surface 8 at an oblique angle. The oblique angle is preferably between 30° to 60° with respect to an observation direction from a sensor 11 to the projected pattern. Mirrors 4, 6 may be used direct the projected light through the optical system 5 and to fold the optical path such that the system can be made more compact, but they are not functionally necessary. Further, two polarizers 7, 9 arranged along the light path before and after the light falls on the object surface 8 serve to reduce specular reflection from the object surface 8 being picked up. It is an option that may be useful for some specific applications. Another optical system 10 is then used to image the object to the sensor 11, which may comprise a CCD camera. A processing system (not shown) then processes the image obtained by the sensor 11 at each position that the patterned grating 2 is moved.

In general, what is proposed is to use a light source 1 in combination with a binary grating 2 to allow a discrete pattern to be projected onto the inspected surface 8. To change the binary pattern in every image snapshot, the binary pattern created by the grating will be shifted in space with respect to the stationary light source 1 and inspected surface 8 as well as the imaging sensor 11. As noted earlier, since the projected pattern is binary, the image information will also be binary. With such a bright-or-dark (binary) image acquired for each image position, issues like image saturation and specular nature of the imaged surface can be avoided.

A binary string consisting of a series of "1"s and "0"s is first created, and a binary pattern is then constructed in accordance with the binary string such that bright and dark bands of light of equal width correspond to positions of "1"s and "0"s from the binary string respectively. The binary pattern of light is then projected onto the surface using a binary grating 2 on a variable active pattern as aforesaid. The binary pattern appears as a series of parallel bright and dark stripes constructed in accordance with the selected binary string. By using the binary fringe pattern (that is, light is either allowed to pass through or blocked), a distinct binary code is generated at each surface point by shifting the fringe pattern multiple times with respect to the surface. The bit values ("1" or "0") of different positions of the pattern at any particular time are globally related to one another since the binary grating is consistent, there is only one light source, and the change in pattern value is only induced by a physical and global shifting of the grating in space.

At each position of the fringe pattern, an image of the illuminated surface is captured. Such binary codes are readable in both the fringe pattern and the image data, and would allow correspondence between the fringe pattern and the image space to be established. Such correspondences, each referable to a surface point on the illuminated surface, would in turn allow a three-dimensional profile of the illuminated surface to be reconstructed. The height of each predetermined point on the surface is calculated relative to a reference plane based upon the images cumulatively obtained at said predetermined point. The reference plane is a flat surface used during a calibration step, which includes the steps of projecting the binary pattern of light onto the flat surface, shifting the binary pattern with respect to the flat surface multiple times, and at each position of the binary pattern obtaining an image of the binary pattern illuminating the flat surface.

The following are the basic mathematical and geometrical principles involved in the imaging process.

Figure 2:
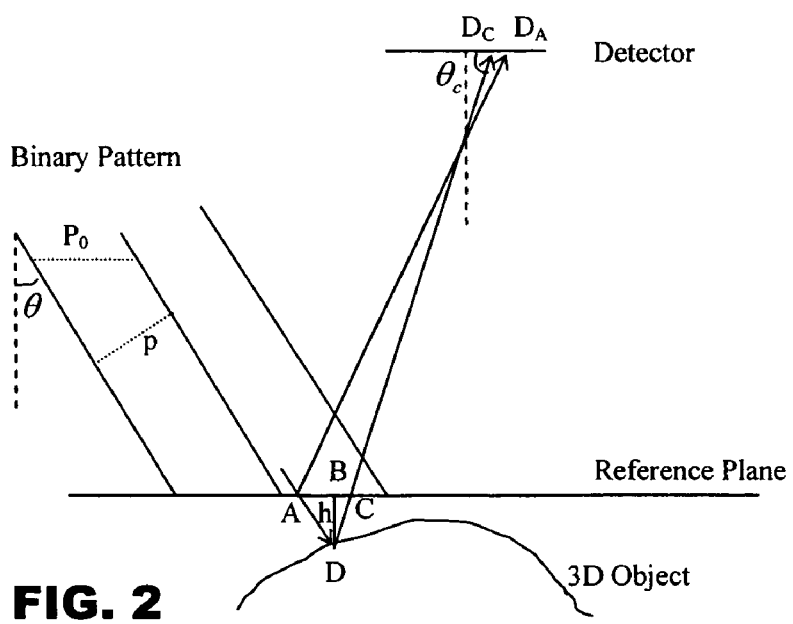
FIG. 2 is a schematic diagram showing the optical geometry of an illumination source, object surface and image detector to illustrate how a relative height of a point on the object surface may be derived.

FIG. 2 is a schematic diagram showing the optical geometry of an illumination source, object surface and image detector to illustrate how a relative height of a point on the object surface may be derived. A binary pattern of period p is projected or imaged onto a three-dimensional object, with an offset angle θ from the observation direction. The object shape determinable by relative heights h(x,y) of points on the object surface is measured from a reference plane. $D_A$ is one detector in the image plane and is used to measure intensity at A on the reference plane. $D_C$ is another detector in the image plane and is used to measure intensity at D on the object.

The intensity observed at D (D is an edge point) is the same as that which would have been observed at A on the reference plane. Assume that A and D are projections of a same edge of a binary pattern on the reference plane and the object respectively. A is in the ith column in the reference image (i.e., detector $D_A$ is in the ith column of CCD array) and D is in the jth column in the object image (i.e., detector $D_C$ is in the jth column of CCD array). Also assume that the CCD resolution is $R_{CCD}$ (in terms of μm/pixel) and the magnification of imaging system M (in terms of magnified times). The geometrical distance AC can be determined by the relative distances of i and j in the image plane for the points A and D, observed by the same detector $D_c$. Displacement AC can be calculated by:

$$AC = |i - j|\frac{R_{CCD}}{M}$$

In turn, AC is related to the surface height h=BD by:

$$h = BD = AC \cdot \cot\theta / (1 + \cot\theta / \tan\theta_c) = |i - j|\frac{R_{CCD}}{M} / (1 + \cot\theta / \tan\theta_c)$$

where the angles θ and $θ_c$ are as shown in FIG. 2. In practice, since the image sensing array is very small compared with the imaging distance and could be adjusted to have an orientation almost orthogonal to the reference plane, $\theta_c$ is nearly 90 degrees. The above relation could thus be further simplified to:

$$h = BD = AC \cdot c\tan\theta = |i - j|\frac{R_{CCD}}{M} \cdot \cot\theta$$

Therefore, the relative height h of each point on the object surface may be calculated from the values of i and j that are determinable from multiple images captured by the CCD.

During actual implementation according to the preferred embodiment, the same fringe pattern is projected onto the target object. By shifting a specially-designed fringe pattern multiple times, and capturing an image of the illuminated object each time, a unique codeword consisting of a binary string is obtained for each point on the inspected surface along an axis. In other words, the codeword is comprised of the sequence of "1's" and "0's" obtained in the same order as the image sequence at every image position. The values of i and j for points with the same codewords and the relative height h is calculated using the above formula.

Thus, during operation, a unique codeword is developed for each predetermined point by determining whether the predetermined point was illuminated on each of the images obtained at each position of the binary pattern with respect to the surface. The unique codeword is compared against codewords obtained with respect to the reference plane to find matching codewords. The height of the predetermined point relative to the reference plane can then be calculated using the above formula.

Utilizing an Irregular Binary Pattern

Figure 3:
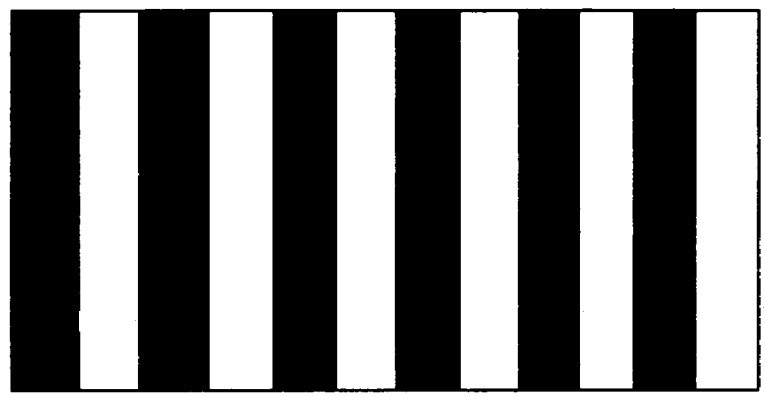
FIG. 3 is an example of a regular binary pattern that has six cycles.
Figure 4:
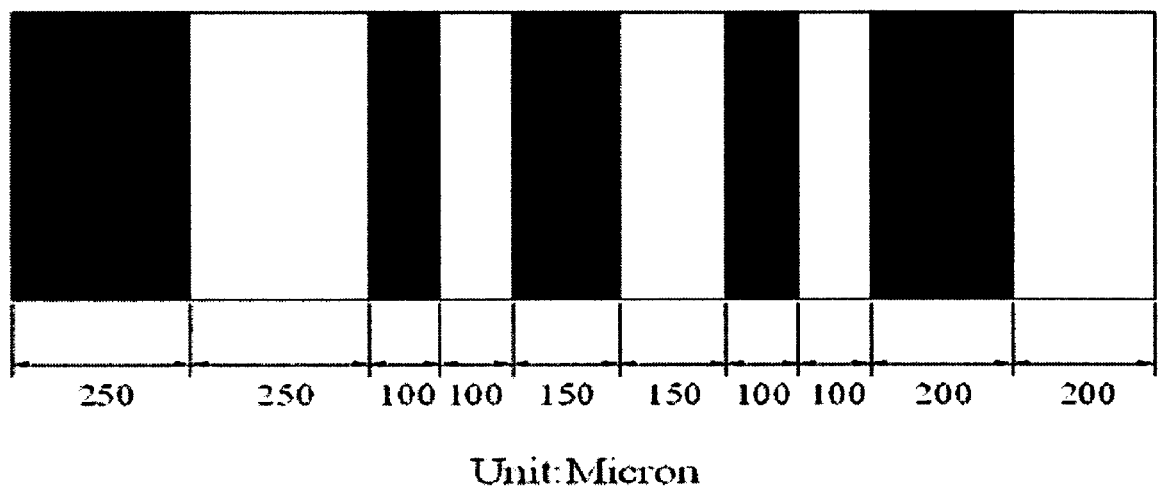
FIG. 4 is an example of an irregular binary pattern.

In the above binary pattern projection approach, the binary pattern can comprise either a regular or an irregular pattern. A regular pattern is illustrated in FIG. 3, wherein it is composed by separate bright regions and dark regions that have the same widths. An example of an irregular pattern is illustrated in FIG. 4, wherein there are at least two bright regions and two dark regions whose widths are different.

The advantage of using an irregular pattern is that the inspected object surface may be reconstructed at higher speed by making it possible to decrease the number of images required to obtain a unique binary codeword for each point on the object surface. The form of a regular pattern is too simple, and thus more images must be captured to generate unique codewords for each point on the object surface.

Some Assumptions:
1. The optics, projecting binary pattern onto inspected surface, can be considered as a low-pass filter. Therefore, it has a limited bandwidth, which means the optics can project the limited frequency pattern. Assuming the minimal period of a regular pattern that the projection optics can acceptably project in use is P due to limitations of the lens system, and the lengths of the black region and white region are both P/2.
2. By shifting the grating several times, it is equivalent to cutting the grating into several regions. We can call these regions Grating-Motion Induced Zone (GZ).
3. Each time, the shifting displacement is $\Delta P$ or an integer multiple thereof. Therefore, the minimal pattern can be cut into $2K=int(P/\Delta P)$ GZs, among which K GZs are '0' representing black and K GZs are '1' representing white.

Definitions:
1. Basic Cell (BC): A set which combines a number of continuous GZs '0' and a number of continuous GZs '1'. It can be expressed by $$\underbrace{CC \cdots C}_{A}\underbrace{\overline{CC} \cdots \overline{C}}_{B}$$

(length is L=A+B), where C represents one status '1' or '0', $\overline{C}$ represents the complement of C.
2. Equivalent Basic Cell: One basic cell which has the same lengths of '0' or '1', It can be expressed by $$\underbrace{CC \cdots C}_{A}\underbrace{\overline{CC} \cdots \overline{C}}_{A}.$$

3. Non-Equivalent Basic Cell: One basic cell which has the different lengths of '0' or '1'. It can be expressed by $$\underbrace{CC \cdots C}_{A}\underbrace{\overline{CC} \cdots \overline{C}}_{B} \quad A \neq B$$

4. Basic Cell Set (BCS): A set contains all combinations of different length C and $\overline{C}$.

$$BCS = \left\{\underbrace{CC \cdots C}_{A}\underbrace{\overline{CC} \cdots \overline{C}}_{B} \quad A, B = K, K+1 \ldots \right\},$$

where, A, B should be bigger or equal than K (introduced in above) so that the optics can project these Basic Cells properly.
5. Irregular pattern: A binary pattern which contains one or any elements of Basic Cell Sets. Which means choose one or any number of Basic Cells from Basic Cell Set (BCS), then combine them together.

Design of an Irregular Pattern:

Given a fixed period P which is determined by the Z-measurement range, and a fixed shifting displacement $\Delta P$ which relates to an X-Y resolution requirement, an optimal pattern is designed whose length is $P/\Delta P$ GZs, so that the image number n is minimal, i.e., each of these $P/\Delta P$ GZs have a unique codeword (a codeword's length is n bits) in these n images.

The length of codeword n should satisfy:

$$n \geq \left(\log_2 \frac{P}{\Delta P} + 1\right).$$

But if the pattern could not be arbitrarily changed, n usually cannot be close to $$\left(\log_2 \frac{P}{\Delta P} + 1\right).$$

As for a Regular Pattern, $$n = \frac{P}{2\Delta P}$$

As for an Irregular Pattern, $$\left(\log_2 \frac{P}{\Delta P} + 1\right) \leq n \leq \frac{P}{2\Delta P}$$

$$\underbrace{CC\cdots C}_{K}\underbrace{\overline{CC}\cdots \overline{CC}}_{K}\underbrace{CC\cdots CC}_{K+1}\underbrace{\overline{CC}\cdots \overline{CC}}_{K}\underbrace{CC\cdots C}_{K}$$

$$\underbrace{\overline{CC}\cdots \overline{C}}_{K+1}\ldots \underbrace{CC\cdots C}_{L+1}\underbrace{\overline{CC}\cdots \overline{CC}}_{L-1}\underbrace{CC\cdots C}_{L}\underbrace{\overline{CC}\cdots \overline{C}}_{L+1}$$

A pattern is designed which has a length of P/ΔP GZs. Several Basic Cells from Basic Cell Set $BC_1, BC_2 \ldots, BC_w$ are chosen that have lengths of $L_1, L_2 \ldots, L_w$ respectively. In the procedure, it should be determined that we should guarantee that $$L_1 + L_2 + \cdots + L_w \geq \frac{P}{\Delta P}.$$

There will be some designs satisfying this condition.

For each candidate, we can optimize its shifting strategy as described below to achieve a minimum number of images. For all the candidates, Shifting Strategy Optimization should preferably be performed. These candidates will have different minimum number of images. The pattern with the least number of images among all these candidates is usable as the optimized pattern.

Optimizing Shifting Strategy

Given an Irregular Pattern, adopting different Shifting Strategies will lead to different numbers of images, i.e. different codewords. So the Shifting Strategy can be optimized to achieve the least number of captured images.

A global searching algorithm is adopted to search for global optimized Shifting Strategy, as follows:

1. With an irregular pattern, $C_1C_2C_3 \ldots C_M$, whose length is M GZs, do p-cycle permutation (p from 1 to M). Thus we can get M patterns.

$$\begin{cases} C_1C_2C_3 \cdots C_{M-1}C_M \\ C_2C_3C_4 \cdots C_MC_1 \\ \vdots \\ C_MC_1C_2 \cdots C_{M-1} \end{cases}$$

2. Let n=2.
3. Let Count=1. Select any n patterns from above pattern set. These n patterns will give M column of n-bit-length codewords.

$$\begin{cases} C_{M-i}C_{M-i+1} \cdots C_MC_1C_2 \cdots C_{M-i-1} \\ \vdots \\ C_{M-j}C_{M-j+1} \cdots C_MC_1C_2 \cdots C_{M-j-1} \\ \vdots \\ C_{M-k}C_{M-k+1} \cdots C_MC_1C_2 \cdots C_{M-k-1} \end{cases}$$

The subscripts of the first GZs of these n patterns need not be continuous. These M n-bit-length codewords will be:

$$\{C_{M-i} \ldots C_{M-j} \ldots C_{M-k}, \ldots, C_{M-i-1} \ldots C_{M-j-1} \ldots C_{M-k-1}\}$$

4. Check whether these M codewords are unique or not (i.e. whether any two of them are same). If they are unique, then stop, the n patterns will give the Shifting Strategy.
5. If $$\text{Count} = \binom{M}{n},$$

then go to step 6. Select other different n pattern combinations. Let Count=Count+1.
6. Let n=n+1, go to step 3.

Bit-pairing Mechanism

The pattern design can further be optimized by using a bit pairing mechanism. If the bit-pairing mechanism is not adopted, shifting a M-bit Binary Pattern n times will produce M n-bit-length codewords. The length of these codewords is n bits. However once a bit-pairing mechanism is adopted, shifting the M-bit Binary Pattern n times will produce M 2n-bit-length codewords. The length of these codewords is 2n bits, which is longer than that produced without a bit-pairing mechanism. Therefore, the longer length codeword means a greater likelihood that these M codewords are unique. So adopting bit-pairing mechanism will reduce the number of images.

The following is a possible algorithm for implementing a design shifting strategy with a bit-pairing mechanism:

1 With the irregular pattern, $C_1C_2C_3 \ldots C_M$, whose length is M bits, do p-cycle permutations (p from 1 to M). Thus we can get M patterns.

$$\begin{cases} C_1C_2C_3 \cdots C_{M-1}C_M \\ C_2C_3C_4 \cdots C_MC_1 \\ \vdots \\ C_MC_1C_2 \cdots C_{M-1} \end{cases}$$

2 Let n=2.
3 Let Count=1. Select n patterns from above pattern set. These n patterns will give M 2n-bit-length codewords.

$$\begin{cases} C_{M-i}C_{M-i+1} \cdots C_MC_1C_2 \cdots C_{M-i-1} \\ \vdots \\ C_{M-j}C_{M-j+1} \cdots C_MC_1C_2 \cdots C_{M-j-1} \\ \vdots \\ C_{M-k}C_{M-k+1} \cdots C_MC_1C_2 \cdots C_{M-k-1} \end{cases}$$

These M 2n-bit-length codewords will be:

$$\{C_{M-i}C_{M-i+1}\ldots C_{M-j}C_{M-j+1}\ldots C_{M-k}C_{M-k+1},\ldots,$$
$$C_{M-i-2}C_{M-i-1}\ldots C_{M-j-2}C_{M-j-1}\ldots C_{M-k-2}$$
$$C_{M-k-1}\}$$

4 Check whether these M codewords are unique or not, i.e. whether there are any two of them are same). If they are unique, then stop, the n patterns will give the Shifting Strategy.

5 If $$\text{Count} = \binom{M}{n},$$

then go to step 6. Select other different n patterns. Let Count=Count+1.

6 Let n=n+1, go to step 3.

Spatial-Temporal-Domain Edge Location

As the projected image will be influenced by surface reflectivity, discontinuity of surface reflectivity may cause the distortion of a pattern image, which will tend to lead to the edge shifting. Accordingly, the edge detected from an image will tend to shift from its real position.

To solve this problem, the following approach is devised that can be referred to as a spatial-temporal-domain edge location approach. Generally, the edge points in the image are estimated with greater accuracy using this approach. By working out the positions of the edge points using this approach, inaccuracy in the above height calculations arising from distortions due to discontinuity of surface reflectivity may be reduced.

First, a sequence of images is taken with pattern shifting as described above. The image sequence contains K images. The image size is W (width)×H (height)

The following algorithm is then applicable:

1. Let Index=1. (Calculate the $1^{st}$ image)
2. Establish a $\Delta_{index}(x,y)$ map of the Indexth image (where (x,y) are the position coordinates of a point in the image and index is the image number), applying the formula:

$$\Delta_{index}(x, y) = \frac{|I_{index} - [\max(I_1, I_2, \ldots, I_k) + \min(I_1, I_2, \ldots, I_k)]/2|}{\max(I_1, I_2, \ldots, I_k) - \min(I_1, I_2, \ldots, I_k)}$$

where I is the image intensity at point (x,y). In particular, the points (x,y) at which $\Delta_{index}(x,y)$ are smallest are taken to be the edge points.

3. Set x=1.
4. In the Indexth $\Delta_{index}(x,y)$ map, along the xth column, find all local minimums $\{\Delta_{index}(x,y_1), \Delta_{index}(x,y_2), \ldots, \Delta_{index}(x,y_m)\}$. $\{(x,y_1),(x,y_2),\ldots,(x,y_m)\}$, which will be the edge points in the xth column.
5. Set x=x+1.
6. If x>W, then go to step 7; else go to step 4;
7. Combine all the $\{(x,y_1),(x,y_2),\ldots,(x,y_m)\}$ x=1 ... W into one set $S_{Index}$, which will be all the edge points of the Indexth image.
8. Let Index=Index+1.
9. If Index>K, then stop; else go to step 2.

The Edge Point Sets of every image $S_{Index}$ Index=1,2, ..., K can thus be obtained as output. Height calculations of points on the object surface will be based on these point sets as the edge points.

Illustration of Reconstruction Process

FIGS. 5(a)-5(c) illustrate an exemplary three-dimensional reconstruction process for an inspected surface utilizing the irregular binary pattern of FIG. 4 projected onto the surface. In the experimental set-up, the minimal period of a pattern that could be projected properly by the projection optics was 200 microns. Therefore, an irregular pattern with a period of 1600 microns as per FIG. 4 was used. In one period, the minimal width of one dark stripe or one bright stripe was 100 microns. During displacement, the displacement for each shift of the binary pattern was set to be 50 microns, and the binary pattern was divided into 32 grating zones. An optimal shifting strategy was then devised as aforesaid, and 32 unique codewords were produced.

In FIG. 5(a), the multi-stripe binary pattern was projected onto a flat reference surface during a calibration phase and the binary pattern was shifted six times. An image was captured of the binary pattern at the commencement position and each time it was shifted. A total of seven images were obtained in the illustrated sequence.

Thereafter, in FIG. 5(b), the multi-stripe binary pattern was projected onto the inspected surface during the operation phase. The shifting of the binary pattern was the same as that performed on the flat reference surface, and an image was captured of the binary pattern at the commencement position and each time it was shifted. A total of seven images were similarly obtained in the illustrated sequence.

Based upon the captured images, a three-dimensional reconstruction of the inspected surface was conducted, and the result as observed from three different angles is shown in FIG. 5(c). The surface profile could thus be accurately reproduced.

It would be appreciated that the processing methods according to the preferred embodiments of the invention offer a further advantage in dealing with multi-reflection that is common with highly specular devices such as BGA devices. Multi-reflection occurs when light reflected from a specular surface coincides with light observed at another point so as to cause an error in determining whether the point comprised a bright or dark region when reconstructing the three-dimensional surface. Since the above approach is based on a binary pattern, the values in the images will either be "1" or "0", and will not be influenced by the gray-level intensity. Due to multi-reflection, there may be positions on the images where the stripes contain isolated noise caused by multi-reflection. By eliminating the noise, areas where multi-reflection occurs can be corrected. However, in some situations where multi-reflection does not result in observable noise because a bright stripe coincides with a dark stripe at the observation location, an error can still be detected by utilizing a suitable algorithm. Such erroneous values may be discounted.

The invention described herein is susceptible to variations, modifications and/or additions other than those specifically described and it is to be understood that the invention includes all such variations, modifications and/or additions which fall within the spirit and scope of the above description.

The invention claimed is:

1. A method of reconstructing a surface profile of a surface of an object, the method comprising the steps of:

creating a binary string consisting of a series of "1"s and "0"s;

projecting a binary pattern of light onto a flat reference surface not comprising the surface of the object, said binary pattern being constructed in accordance with the binary string such that bright and dark bands of light correspond, respectively, to "1"s and "0"s of the binary string;

shifting the same binary pattern with respect to the flat reference surface multiple times;

at each position of the binary pattern with respect to the flat reference surface, obtaining an image of the binary pattern illuminating the flat reference surface and creating a unique binary codeword for each respective point on the flat reference surface depending upon whether the point is illuminated during each shift of the binary pattern; then projecting the binary pattern of light onto the surface of the object, shifting the same binary pattern with respect to the surface of the object multiple times;

at each position of the binary pattern with respect to the surface of the object, obtaining an image of the binary pattern illuminating the surface and creating a unique binary codeword for each respective point on the surface depending upon whether the point is illuminated during each shift of the binary pattern; and thereafter with respect to each predetermined point on the surface, comparing the unique codeword created from the surface of the object against the unique codeword created from the flat reference surface to find matching codewords, and calculating a height of the point relative to the flat reference surface.

2. The method as claimed in claim 1, wherein the projected light is derived from a stationary light source and a movable patterned grating comprising the binary pattern.

3. The method as claimed in claim 2, wherein the step of shifting the binary pattern multiple times with respect to the surface comprises shifting the patterned grating by a predetermined distance with respect to the stationary light source such that all points on the surface are illuminated at least once.

4. The method as claimed in claim 1, wherein the binary pattern of light comprises a variable active pattern operable to generate a series of predetermined images with a fixed binary pattern that is shifted in space.

5. The method as claimed in claim 1, wherein the binary pattern comprises a series of parallel bright and dark stripes constructed in accordance with the binary string.

6. The method as claimed in claim 5, wherein the binary pattern projected onto the surface is regular and is composed of separate bright and dark regions of equal widths.

7. The method as claimed in claim 5, wherein the binary pattern projected onto the surface is irregular and has at least two bright regions or two dark regions with different widths.

8. The method as claimed in claim 1, including the step of imaging the binary pattern onto the surface of the object at an oblique angle.

9. The method as claimed in claim 8, wherein the oblique angle is between 30° to 60° with respect to an observation direction.

* * * * *